(12) United States Patent
Hooli et al.

(10) Patent No.: US 11,997,045 B2
(45) Date of Patent: May 28, 2024

(54) HYBRID AUTOMATIC REPEAT REQUEST FEEDBACK ARRANGEMENT FOR NR-UNLICENSED BANDS

(71) Applicant: NOKIA TECHNOLOGIES OY, Espoo (FI)

(72) Inventors: Kari Juhani Hooli, Oulu (FI); Esa Tapani Tiirola, Kempele (FI); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 960 days.

(21) Appl. No.: 16/969,231

(22) PCT Filed: Feb. 12, 2019

(86) PCT No.: PCT/FI2019/050109
§ 371 (c)(1),
(2) Date: Aug. 12, 2020

(87) PCT Pub. No.: WO2019/158820
PCT Pub. Date: Aug. 22, 2019

(65) Prior Publication Data
US 2021/0006377 A1 Jan. 7, 2021

Related U.S. Application Data

(60) Provisional application No. 62/710,405, filed on Feb. 16, 2018.

(51) Int. Cl.
*H04L 5/00* (2006.01)
*H04L 1/1829* (2023.01)

(52) U.S. Cl.
CPC .......... *H04L 5/0055* (2013.01); *H04L 1/1854* (2013.01); *H04L 1/1864* (2013.01); *H04L 5/001* (2013.01); *H04L 5/0098* (2013.01)

(58) Field of Classification Search
CPC ... H04L 5/0055; H04L 1/1854; H04L 1/1864; H04L 5/001; H04L 5/0098; H04L 5/0053
See application file for complete search history.

(56) References Cited

U.S. PATENT DOCUMENTS

| 2016/0212734 A1* | 7/2016 | He .............................. H04L 5/14 |
| 2017/0126346 A1 | 5/2017 | Chendamarai Kannan et al. |
| 2017/0280430 A1* | 9/2017 | Yin ........................ H04W 72/23 |

FOREIGN PATENT DOCUMENTS

| WO | WO 2017/099835 A1 | 6/2017 |
| WO | WO-2017099835 A1 * | 6/2017 |

(Continued)

OTHER PUBLICATIONS

Extended European Search Report dated Oct. 15, 2021 corresponding to European Patent Application No. 19754257.4.

(Continued)

*Primary Examiner* — Hardikkumar D Patel
(74) *Attorney, Agent, or Firm* — SQUIRE PATTON BOGGS (US) LLP

(57) ABSTRACT

Embodiments of the invention include a method and apparatus to perform initiating a downlink association set and a hybrid automatic repeat request feedback associated to receiving a first downlink data on a first downlink burst (710); receiving a second downlink data on a second downlink burst, associating the receiving second downlink data to the downlink association set and hybrid automatic repeat request feedback based on the first acknowledgement timing value (720); and determining transmission timing for hybrid automatic repeat request feedback based on a second acknowledgement timing value (730). Further, to perform sending first downlink control information associated to at least one first downlink data, wherein the first downlink control information comprises a first acknowledgment timing value for acknowledgment of the first downlink data;

(Continued)

sending on a second downlink burst second downlink control information associated to second downlink data; and receiving hybrid automatic repeat request feedback based on a second acknowledgement timing value comprised in the second downlink control information.

18 Claims, 6 Drawing Sheets

(56) References Cited

FOREIGN PATENT DOCUMENTS

| WO | WO 2018/029637 A1 | 2/2018 | |
|----|----|----|----|
| WO | WO-2019098896 A1 * | 5/2019 | ............ H04B 7/0478 |

OTHER PUBLICATIONS

Vivo, "UE processing time and HARQ timing," 3GPP Draft; R1-1717498, 3GPP TSG RAN WG1 Meeting #90bis, Prague, Czech Republic, Oct. 8, 2017, XP051340686.

First Examination Report dated Nov. 30, 2021 corresponding to Indian Patent Application No. 202047038270.

International Search Report & Written Opinion dated May 16, 2019 corresponding to International Patent Application No. PCT/FI2019/050109.

Nokia, Nokia Shanghai Bell, "On remaining aspects of NR CA/DC," 3GPP Draft; R1-1718608, 3GPP TSG-RAN WG1 Meeting NR#90bis, Prague, CZ, Oct. 2, 2017.

Nokia, Nokia Shanghai Bell, "Remaining aspects of NR CA," 3GPP Draft; R1-1800745, 3GPP TSG RAN WG1 Meeting AH 1801, Vancouver, Canada, Jan. 12, 2018.

* cited by examiner

TABLE1. UE PROCESSING TIME AND HARQ TIMING (CAPABILITY#1, BASELINE)

| CONFIGURATION | HARQ TIMING PARAMETER | UNITS | 15KHz SCS | 30KHz SCS | 60KHz SCS | 120KHz SCS |
|---|---|---|---|---|---|---|
| FRONT-LOADED DMRS ONLY | N1[1] | SYMBOLS | 8 | 10 | 17 | 20 |
| FRONT-LOADED+ ADDITIONAL DMRS | N1 | SYMBOLS | 13 | 13 | 20 | 24 |
| FREQUENCY-FIRST REMAPPING | N2[1] | SYMBOLS | 10 | 12 | 23 | 36 |

TABLE2. UE PROCESSING TIME AND HARQ TIMING (CAPABILITY#2, AGGRESSIVE)

| CONFIGURATION | HARQ TIMING PARAMETER | UNITS | 15KHz SCS | 30KHz SCS |
|---|---|---|---|---|
| FRONT-LOADED DMRS ONLY | N1 | SYMBOLS | [2.5-4] | [2.5-6] |
| FRONT-LOADED+ ADDITIONAL DMRS | N1 | SYMBOLS | [12] | [12] |
| FREQUENCY-FIRST REMAPPING | N2 | SYMBOLS | [2.5-6] | [2.5-6] |

FIG.2

HYBRID AUTOMATIC REPEAT REQUEST FEEDBACK ARRANGEMENT FOR NR-UNLICENSED BANDS

RELATED APPLICATION

This application was originally filed as PCT Application No. PCT/FI2019/050109 on Feb. 12, 2019, which claims priority from U.S. Provisional Application No. 62/710,405, filed on Feb. 16, 2018.

TECHNICAL FIELD

The teachings in accordance with the exemplary embodiments of this invention relate generally to 5G/New Radio operation on unlicensed spectrum and, more specifically, relate to improving HARQ-ACK feedback operation in 5G/New Radio operation.

BACKGROUND

This section is intended to provide a background or context to the invention that is recited in the claims. The description herein may include concepts that could be pursued, but are not necessarily ones that have been previously conceived or pursued.

Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
CA carrier aggregation
CBG code Block Group
COT channel occupancy time
DAI downlink assignment index
DCI downlink control information
DL downlink
DMRS demodulation reference signal
gNB NR base station
HARQ hybrid automatic repeat request
LAA licensed assisted access
LBT listen before talk
LTE long term evolution
NACK negative acknowledgement
NR new radio
OFDM orthogonal frequency domain multiplexing
PDCCH physical downlink control channel
PDSCH physical downlink shared channel
PUCCH physical uplink control channel
PUSCH physical uplink shared channel
RRC radio resource control
RN relay node
SI study item
UE user equipment Communication advances seek to increase data rates, such as in 3GPP NR Rel-15 networks where designers have worked to improve signaling techniques in mobile data communication. A dramatic advancement in mobile data communication has led to a use of the unlicensed spectrum. With these types of advancements the HARQ-ACK response is considered closely as it can result in a large amount of signaling overhead.

The example embodiments of the invention work to at least provide novel HARQ-ACK operations to improve performance in the networks.

SUMMARY OF THE INVENTION

According to an exemplary embodiment of the invention a method is provided wherein a user device, initiates at least one of a downlink association set and a hybrid automatic repeat request feedback associated to receiving at least one of a first downlink data on a first downlink burst, where the initiating and receiving is based on a received first downlink control information associated to the at least one first downlink data, wherein the first downlink control information comprises a first acknowledgement timing value; receives at least one of a second downlink data on a second downlink burst, where the receiving is based on a received second downlink control information, and associating the receiving at least one of second downlink data to the at least one of downlink association set and hybrid automatic repeat request feedback based on the first acknowledgement timing value; and determines transmission timing for the said hybrid automatic repeat request feedback based on a second acknowledgement timing value wherein the second acknowledgement timing value is comprised in the second downlink control information.

According to an exemplary embodiment of the invention, the receiving downlink data comprises determining at least one acknowledgement value for the downlink data.

According to an exemplary embodiment of the invention, associating the receiving of downlink data to the at least one of downlink association set and hybrid automatic repeat request feedback comprises the inclusion of the determined at least one acknowledgement value to the hybrid automatic repeat request feedback.

According to a further exemplary embodiment of the invention, the method further comprises transmitting the said hybrid automatic repeat request feedback at the determined transmission timing.

According to an exemplary embodiment of the invention, the downlink data is downlink shared channel data.

According to an exemplary embodiment of the invention, the hybrid automatic repeat request feedback comprises acknowledgement values for all received downlink data associated with the at least one of hybrid automatic repeat request feedback and downlink association set.

According to an exemplary embodiment of the invention, the hybrid automatic repeat request feedback comprises acknowledgment for the at least one second downlink data and, based on the first acknowledgment timing value, acknowledgment for the at least one first downlink data.

According to an exemplary embodiment of the invention, a downlink assignment index is comprised in the received downlink control information and the downlink assignment index is reset at a beginning of the at least one of downlink association set and hybrid automatic repeat request feedback.

According to an exemplary embodiment of the invention, the second downlink burst is set to follow the first downlink burst associated with the downlink association set.

According to an exemplary embodiment of the invention, the downlink association set contain slots from two different downlink transmission bursts with uncertain timing between the two different downlink transmission bursts.

According to an exemplary embodiment of the invention an apparatus is provided, the apparatus comprising: at least one processor; and at least one memory including computer program code, where the at least one memory and the computer program code are configured, with the at least one processor, to cause the apparatus to at least:

initiate, by a user device, at least one of a downlink association set and a hybrid automatic repeat request feedback associated to receiving at least one of a first downlink data on a first downlink burst, where the initiating and receiving is based on a received first downlink control information associated to the at least one first downlink data, wherein the first downlink control information comprises a first acknowledgement timing value;

receive at least one of a second downlink data on a second downlink burst, where the receiving is based on a received second downlink control information, and associating the receiving at least one of second downlink data to the at least one of downlink association set and hybrid automatic repeat request feedback based on the first acknowledgement timing value; and determine transmission timing for the said hybrid automatic repeat request feedback based on a second acknowledgement timing value wherein the second acknowledgement timing value is comprised in the second downlink control information.

According to an exemplary embodiment of the invention, the receiving downlink data comprises determining at least one acknowledgement value for the downlink data.

According to an exemplary embodiment of the invention, the associating the receiving of downlink data to the at least one of downlink association set and hybrid automatic repeat request feedback comprises the inclusion of the determined at least one acknowledgement value to the hybrid automatic repeat request feedback According to an exemplary embodiment of the invention, the at least one memory including the computer program code is configured with the at least one processor to cause the apparatus to: transmit the said hybrid automatic repeat request feedback at the determined transmission timing.

According to an exemplary embodiment of the invention, the downlink data is downlink shared channel data.

According to an exemplary embodiment of the invention, the hybrid automatic repeat request feedback comprises acknowledgement values for all received downlink data associated with the at least one of hybrid automatic repeat request feedback and downlink association set.

According to an exemplary embodiment of the invention a method is provided, the method comprising:

send, by a network node, to a user device first downlink control information associated to at least one first downlink data, wherein the first downlink control information comprises a first acknowledgment timing value to use for acknowledgment of the at least one first downlink data;

sending, by the network node, on a second downlink burst to the user device second downlink control information associated to at least one second downlink data; and receiving, by the network node, hybrid automatic repeat request feedback based on a second acknowledgement timing value comprised in the second downlink control information, wherein hybrid automatic repeat request feedback comprises acknowledgment for the at least one second downlink data and, based on the first acknowledgment timing value, acknowledgment for the at least one first downlink data.

According to an exemplary embodiment of the invention, the second downlink control information is set to follow a downlink burst associated with the first acknowledgment timing value.

According to an exemplary embodiment of the invention an apparatus is provided, the apparatus, comprising: at least one processor; and at least one memory including computer program code, where the at least one memory and the computer program code are configured, with the at least one processor, to cause the apparatus to at least:

send, by a network node, to a user device first downlink control information associated to at least one first downlink data, wherein the first downlink control information comprises a first acknowledgment timing value to use for acknowledgment of the at least one first downlink data;

send, by the network node, on a second downlink burst to the user device second downlink control information associated to at least one second downlink data; and receive, by the network node, hybrid automatic repeat request feedback based on a second acknowledgement timing value comprised in the second downlink control information, wherein hybrid automatic repeat request feedback comprises acknowledgment for the at least one second downlink data and, based on the first acknowledgment timing value, acknowledgment for the at least one first downlink data.

According to an exemplary embodiment of the invention, the second downlink control information is set to follow a downlink burst associated with the first acknowledgment timing value.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 shows Tables 1 and 2 identifying baseline and aggressive user equipment processing Time and HARQ Timing, respectively;

DETAILED DESCRIPTION

In accordance with example embodiments of this invention as described herein, there is proposed a design that will be able to improve HARQ-ACK feedback operation in 5G/New Radio operation.

The example embodiments of the invention relate to HARQ feedback for DL transmissions on unlicensed spectrum, such as 5 GHz spectrum. Other examples of unlicensed spectrum include 2.4 GHz spectrum, 6 GHz spectrum and 60 GHz spectrum. The example embodiments consider operations for HARQ-ACK transmission with slot structures facilitating low-latency HARQ feedback for DL data transmissions, taking UE processing times and regulations related to unlicensed band operation into account. To help provide an understanding of the embodiments of the invention a background of UE HARQ feedback processing is discussed below.

Processing times in LTE LAA and MulteFire:

In LTE LAA (Licensed Assisted Access) and MulteFire, HARQ timing follows n+4 timeline, i.e. HARQ-feedback for DL data (PDSCH) transmitted in subframe n is reported in subframe n +4 (or later). Since according to ETSI standard for 5 GHz unlicensed bands (ETSI EN 301 893 v2.1.1) the duration of a transmission burst (aka transmission opportunity (TXOP) or channel occupancy time (COT)) shared by DL and UL is at most 6 to 10 ms, n +4 timeline means that HARQ-ACK for a DL part of a transmission opportunity needs to often be transmitted in a different transmission burst. It is noted that this can be impractical since listen-before talk (LBT) procedure need to be completed before each transmission burst, and in case there are other devices (e.g. WiFi, LAA or MulteFire) operating in the vicinity, LBT procedure will inevitably introduce delays to HARQ-feedback. Furthermore, this creates additional system complexity (HARQ/scheduling design), as well as implementation complexity (more HARQ processes).

Processing Times in 5G New Radio:

5G/NR support flexible timing for PDSCH, PUSCH scheduling as well as for HARQ feedback for PDSCH. For slot based scheduling:

PDSCH scheduling timing (time between DL assignment and PDSCH) is signaled with slot offset K0 in terms of slots;

HARQ-ACK timing (time between PDSCH and HARQ-ACK transmission) is signaled with K1 (aka PDSCH-to-HARQ feedback timing indicator) in terms of slots. K1 may be signaled e.g. with 3 bits in DCI separately for each DL assignment; and PUSCH scheduling timing (time between UL grant and PUSCH) is signaled with slot offset K2 in terms of slots.

Figure 1:
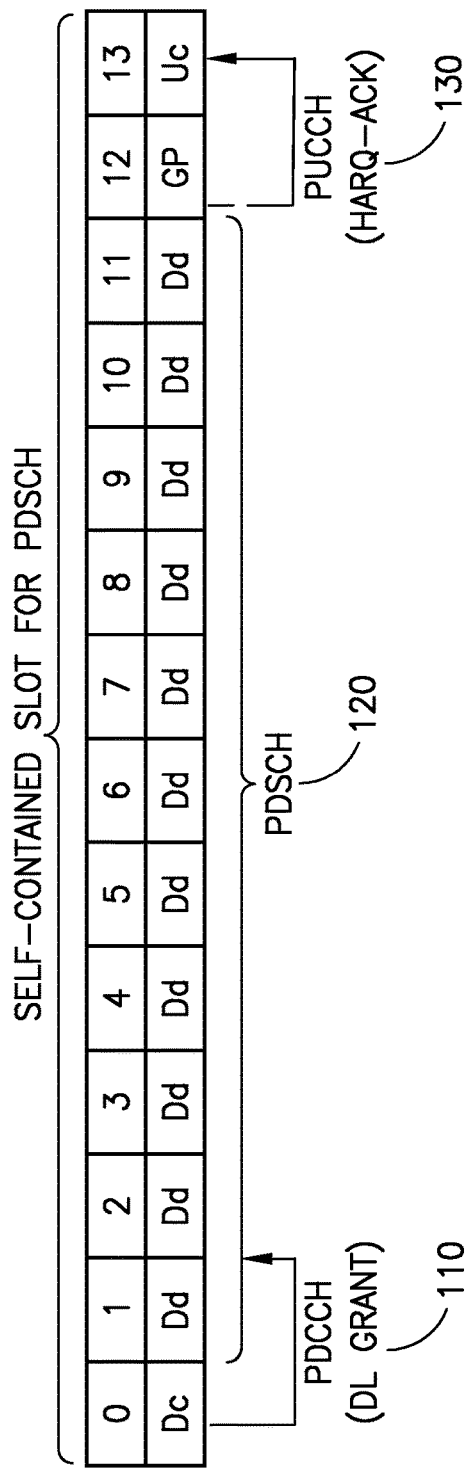
FIG. 1 shows a self-contained slot in 5G New Radio.

5G/NR allows for faster UE processing times than LTE LAA and MulteFire. In an example of a so called self-contained slot, HARQ-ACK for the PDSCH part of a slot is provided at the end (e.g. last symbol) of the same slot. FIG. 1 shows a self-contained slot in 5G New Radio. A UE reports HARQ-ACK for a PDSCH data transmission during the same slot. Dc denotes DL control signals, Dd=DL data, GP=Guard Period, and Uc=UL control signals. The principle is illustrated in FIG. 1, where:

PDCCH DL assignment 110 and the related PDSCH 120 are transmitted in the same slot. This is signaled with PDSCH Scheduling timing K0=0 (slots); and HARQ-ACK 130 for a PDSCH allocation is transmitted in the same slot as the PDSCH itself. This is signaled with HARQ-ACK timing K1=0 slots.

It was agreed in RANI NR Ad-Hoc #2 (June 2017) that RANI should consider the UE processing time(s) in terms of symbols together with absolute time (in µs), in addition to the slot offset K1 discussed above. Parameter N1 denotes the number of OFDM symbols required for UE processing from the end of NR-PDSCH reception to the earliest possible start of the corresponding HARQ-ACK transmission from UE perspective. UE is not expected transmit anything in uplink if the network has set the value of K11 without leaving sufficient time for UE processing.

Parameter N2 denotes the number of OFDM symbols required for UE processing from the end of NR-PDCCH containing the UL grant reception to the earliest possible start of the corresponding NR-PUSCH transmission from the UE perspective. UE is not expected transmit anything in uplink if the network has set the value of K2 without leaving sufficient time for UE processing.

3GPP TS38.214 Sections 5.3 and 6.4 contain parameter N1 and N2 values for baseline as well as for aggressive UE capability. These are summarized in Tables 1 and 2 of FIG. 2. Tables 1 and 2 of FIG. 2 show UE processing times and HARQ timing capabilities for base line and aggressive UE capability, respectively. It should be noted that the shown parameter values for aggressive UE capability are still working assumptions. Additionally, in the case that HARQ-ACK is multiplexed on PUSCH, both N1 and N2 values are increased by 1 symbol (RAN1#91, November 2017 and RANI Adhoc1801, January 2018).

In NR-based LAA (Carrier Aggregation) scenario, HARQ-ACK feedback corresponding the NR unlicensed component carriers (Scells) can be conveyed via Pcell on the licensed component carrier. On the other hand, there are also relevant scenarios where HARQ-ACK for PDSCH needs to be transmitted via unlicensed carrier—e.g. in case of dual connectivity between licensed and unlicensed carriers, or in a standalone deployment solely on unlicensed band without access to any licensed band.

In such cases, it would be beneficial if PDCCH containing scheduling information, DL data and corresponding HARQ-ACK would all occur within the same (DL+UL) transmission burst (aka TXOP or COT). Such design is referred to as self-contained burst or self-contained COT comprising one or more DL slots and a self-contained slot at the end, carrying HARQ feedback for all DL slots of the burst.

Self-contained burst is feasible with aggressive UE processing capabilities. However, it can be seen as too limiting to assume aggressive UE capabilities as a default requirement for all NR UEs on unlicensed band. UEs with baseline processing capabilities, contributing to more affordable modem price, must also be supported by NR unlicensed. On the other hand, UE baseline processing capabilities mean that there is a minimum delay between PDSCH and HARQ feedback in order of 178 us (with 120 kHz SCS) to 571 us (with 15 kHz SCS). As the delay is rather considerable, it is not obvious how to arrange HARQ feedback so that HARQ feedback remains reliable.

Figure 3:
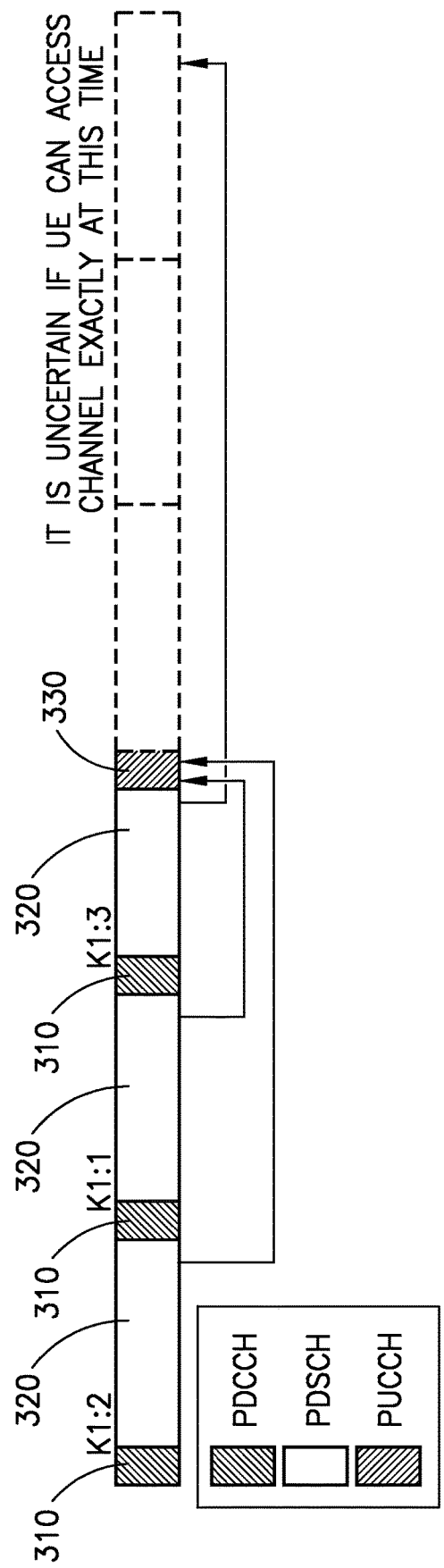
FIG. 3 shows HARQ feedback timing based on Rel-15 NR specification.

FIG. 3 shows HARQ feedback timing based on Rel-15 NR specification. In Rel-15 NR, HARQ-ACK timing (K1) can be signalled for each PDSCH separately in DCI. Both semi-static and dynamic HARQ-ACK codebook determinations are supported. In case of a dynamic codebook, the DL association set (i.e. the association between DL slots for which HARQ-ACK is provided in a given UL slot) is the set of PDSCHs for which the same HARQ-ACK transmission time is indicated. HARQ-ACK transmission time is indicated with 2 indicators: HARQ-ACK timing indicating time on slots, relative to the time of associated PDSCH, and PUCCH resource indicator indicating the starting symbol within the slot. The codebook content is determined based on counter DAI (downlink assignment index) and (possibly) total DAI fields contained in DL assignments.

Figure 4:
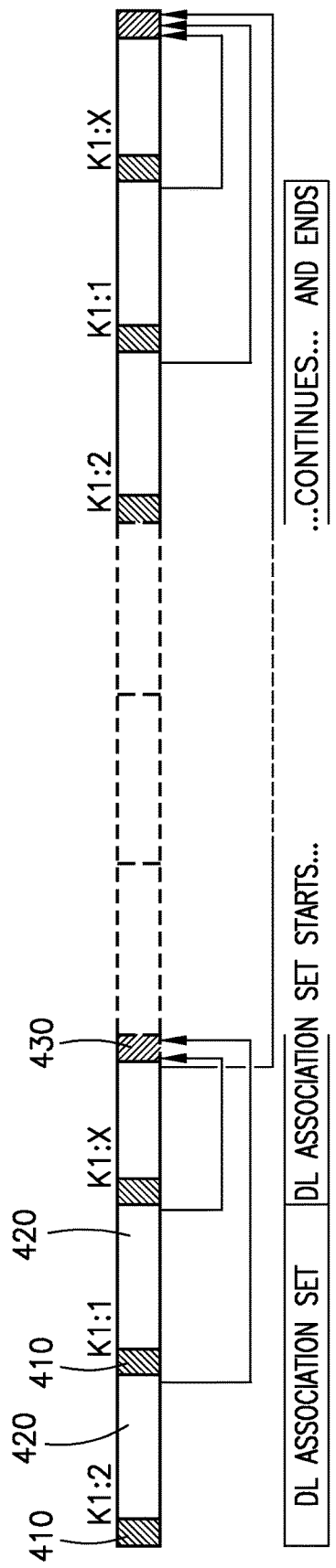
FIG. 4 shows Dynamic codebook determination across COTs.

FIG. 4 shows Dynamic codebook determination across COTs. The DL association set determination for semi-static codebook is still not finalized in Rel-15 NR specification. A HARQ-ACK codebook includes HARQ-ACK bits for one or more slots, mini-slots, transport blocks, code blocks, and/or carriers in a specific order. Further, if UCI is transmitted on PUSCH, total DAI field is included also on UL grant. In other words, the HARQ-ACK timing is determined in NR by DL assignment, which is not feasible on unlicensed band. When HARQ-ACK timing points to next COT due to LBT, the timing of next COT, including next PUCCH timing, is uncertain.

Figure 5:
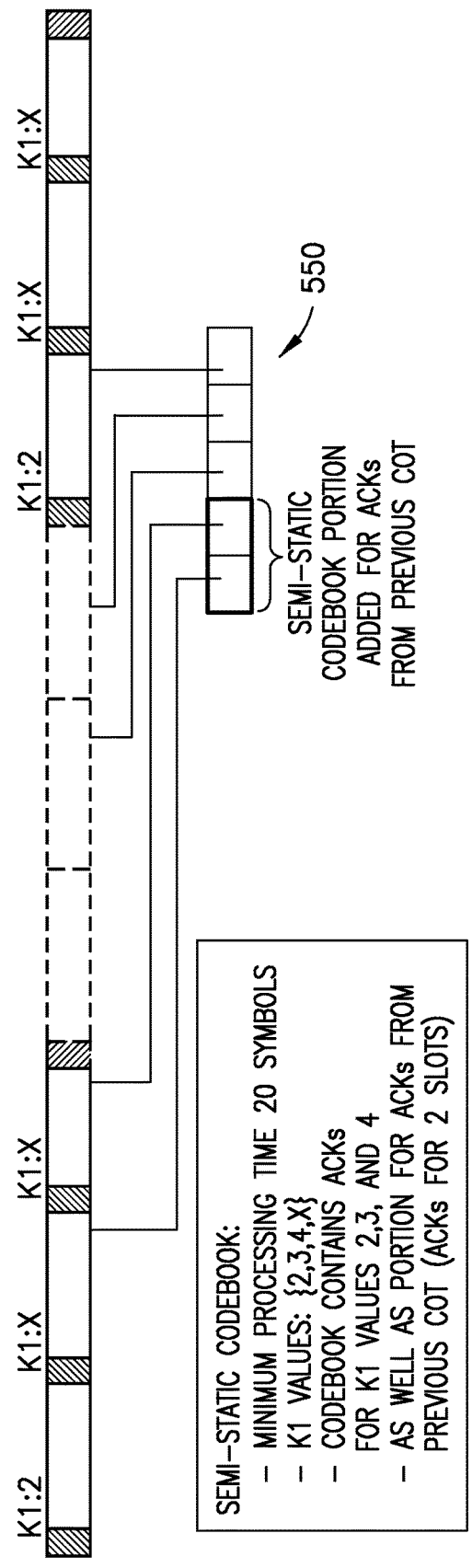
FIG. 5 shows Semi-static codebook determination across COTs.

In both NR and LTE, the HARQ feedback transmitted in the UL in TTI N contains the HARQ-ACKs for PDSCHs transmitted/received in the DL during a time window preceding the TTI N. The time window may be determined semi-statically like in LTE or dynamically based on DL assignments as in NR. However, such time window mechanism is challenging on unlicensed when HARQ feedback is transmitted on a different Tx burst/COT than the associated PDSCHs—the timing relation varies unpredictably according to the channel contention outcome and the gNB scheduling operation. Hence, in the case of MulteFire, the HARQ-ACK codebook is not determined based on a time window but simply contains ACK/NACK bits for all HARQ processes. This is not practical with code block group (CBG) based HARQ-ACK feedback which with up to 16 HARQ processes and up to 8 CBGs sums up to 128-bit HARQ-ACK codebook per carrier. Such large payload can clearly limit the UL control channel coverage. FIG. 5 shows Semi-static codebook determination across COTs. As shown in FIG. 5 there is a semi-static codebook portion 550 added for ACKs of a previous COT.

In another approach is presented in PCT/EP2016/059013 the HARQ feedback is split into two groups by using two timing windows. The first ACK/NACK group is transmitted within the same COT as the associated PDSCHs, while the second ACK/NACK group is transmitted in a different COT in which UE also transmits (another first group of) ACK/NACKs. The HARQ feedback content for the first and second ACK/NACK group is determined separately, e.g., HARQ-ACK bundling may be applied separately. However, as in this approach the HARQ timing is not fixed in NR, but typically dynamically indicated, it is not clear how the HARQ-ACK grouping should be done, or how to handle possibly varying size of the HARQ-ACK groups in the codebook determination.

In the present context, COT means the duration of a transmission or transmission burst, that is, the time that the transmission occupies the channel. Single COT may contain single transmission or both downlink and uplink transmission. In accordance with the embodiments the gNB may determine to perform channel sensing (such as with an LBT procedure) before each COT.

In accordance with example embodiments of the invention there is defined a HARQ-ACK codebook and related DL association set determination mechanism where DL association set may contain slots, mini-slots or downlink shared channels from two different DL Tx bursts with uncertain timing between the DL Tx bursts. The example embodiments of the invention can be used in different options supported by NR, such options include using dynamic and semi-static codebook determinations.

Figure 6:
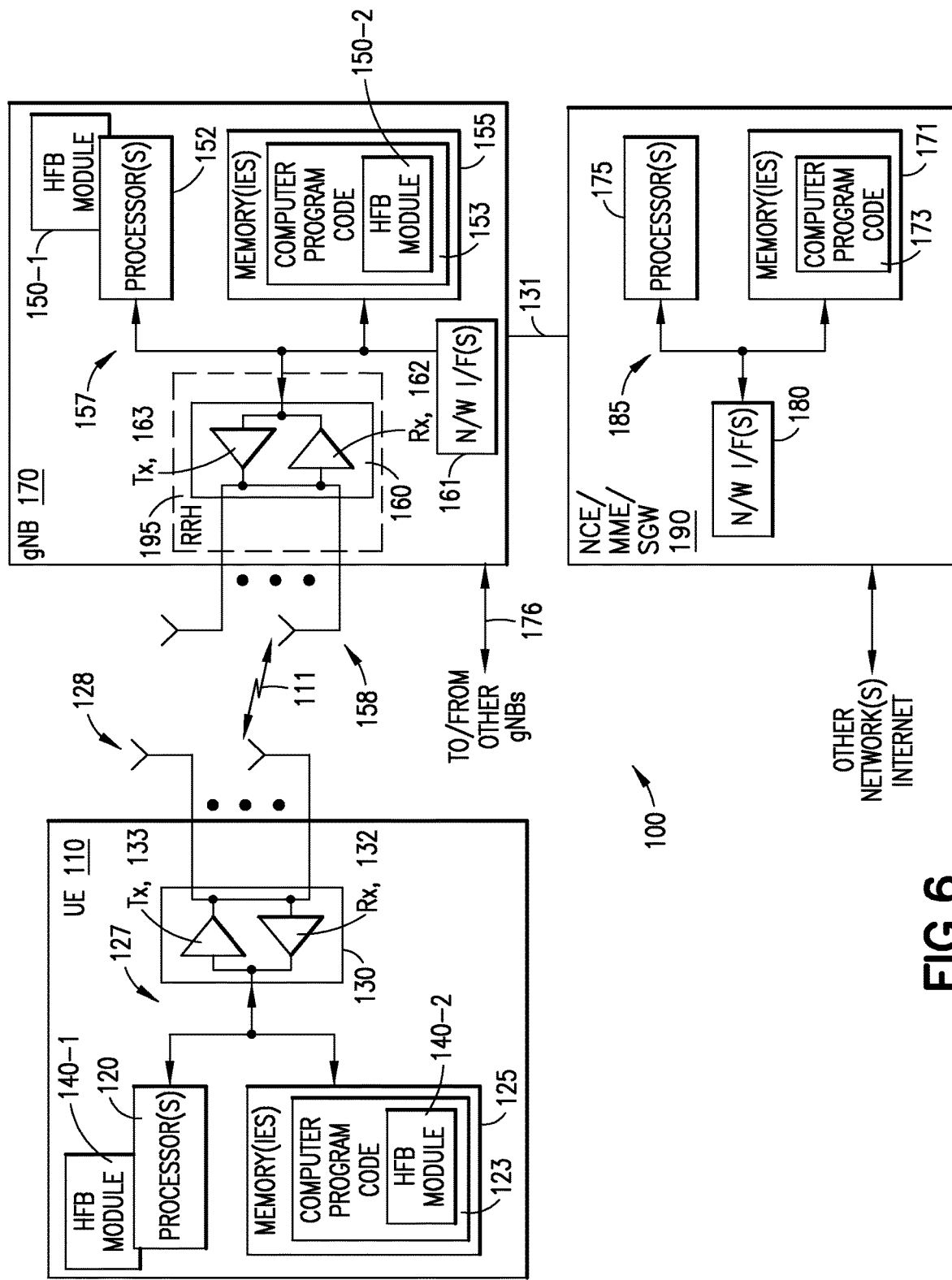
FIG. 6 shows a high level block diagram of various devices used in carrying out various aspects of the invention.

Before describing the example embodiments of the invention in further detail reference is made to FIG. 6. FIG. 6 shows a block diagram of one possible and non-limiting exemplary system in which the exemplary embodiments may be practiced. In FIG. 6, a user equipment (UE) 110 is in wireless communication with a wireless network 100. A UE is a wireless or wired device, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 can include a HARQ feedback processor for user device (Hfb) module 140 which is configured to perform the example embodiments of the invention as described herein. The Hfb module 140 comprising one of or both parts 140-1 and/or 140-2, which may be implemented in a number of ways. The Hfb (HARQ feedback) module 140 may be implemented in hardware as Hfb module 140-1, such as being implemented as part of the one or more processors 120. The Hfb module 140-1 may be implemented also as an integrated circuit or through other hardware such as a programmable gate array. In another example, the Hfb module 140 may be implemented as Hfb module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with gNB 170 via a wireless link 111 and/or link 176.

The gNB 170 (NR/5G Node B or possibly an evolved NB) is a base station (e.g., for LTE, long term evolution, for GSM/(E)GPRS) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a HARQ feedback processor for gNB (Hfb) module 150 which is configured to perform example embodiments of the invention as described herein. The Hfb module 150 comprising one of or both parts 150-1 and/or 150-2, which may be implemented in a number of ways. The Hfb module 150 may be implemented in hardware as Hfb module 150-1, such as being implemented as part of the one or more processors 152. The Hfb module 150-1 may be implemented also as an integrated circuit or through other hardware such as a programmable gate array. In another example, the Hfb module 150 may be implemented as Hfb module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface. The link 176 can comprise NR and/or unlicensed bands.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

The example embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium or other device that may be any media or means that can contain or store the instructions for use by or in connection with an instruction execution system, apparatus, or device, such as a computer.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In addition, it is noted that wireless in-band or out-backhaul or multi-hop backhaul transport services and/or relay links may be used for the different operations in accordance with example embodiments of the invention. In accordance with the embodiments link end points of a backhaul link can be configured to have similar operational capabilities to perform operations in accordance with the embodiments. Further, a relay node, a server, or another network node (e.g. a network control element such as the NCE 190 of FIG. 6) can be configured to perform the novel HARQ feedback related operations of a UE or gNB, such as the UE 110 or gNB 170 as in FIG. 6, in accordance with the embodiments as described herein.

Example embodiments of the invention relate to 5G and looks at HARQ feedback for downlink transmissions in an unlicensed spectrum. Example embodiments consider cases such as a case where the HARQ-ACK feedback for the PDSCH needs to be sent via a carrier in an unlicensed spectrum. In particular, there is considered a HARQ-ACK transmission with slot structures facilitating low-latency HARQ feedback for DL data transmissions. In such a case, it would be beneficial if the scheduling information, downlink data and the HARQ-ACK would take place within the same downlink and uplink burst on the PDCCH.

Embodiments of the invention can use a specific value in a HARQ timing indicator that is reserved for indicating ACK transmission in a later channel occupancy time (COT). ACK transmission may occur on uplink resources which will follow after the next downlink transmission burst. When a UE receives during a first downlink burst the downlink assignment containing a HARQ timing indicator with this specific value, it will set up a new downlink association set. When, in the next burst, the next downlink assignment(s) contain a HARQ timing indicator with a different value, the UE will continue the downlink association set that was set up in the previous downlink burst. In this way, a UE is aware of an uplink slot for PUCCH where it can transmit ACK feedback, for example over a carrier in an unlicensed spectrum. Further description of example embodiments is provided below.

In accordance with an example embodiment there is:
In case of dynamic codebook determination:
A specific value for K1 ("X") in HARQ timing indicator is reserved for indicating ACK transmission in a later COT, ACK transmission may occur on uplink resources after next DL transmission (Tx) burst.
A specific value of K1 may be seen as a "HARQ-ACK timing" that is not yet defined;
The UE may receive one or multiple (consecutive) PDSCH with the specific value (X) during a COT; and/or The (maximum) number of PDSCH with the specific value (X) needed (and/or supported) at the end of the DL Tx burst may depend on the UE processing time capabilities as well as the subcarrier spacing (e.g., according to Table 1 and Table 2 of FIG. 2).

When UE receives the DL assignment with such indicated HARQ timing value (i.e. K1 value "X"), UE initiates a new DL association set with corresponding counter DAI and, possibly, total DAI value(s).

At this stage, ACK transmission time for the DL association set is unknown; and

DAI counter is reset at the beginning of the new DL association set.

When UE detects the next DL assignment (in the next DL burst) with HARQ timing value K1 other than X (say Y), UE continues the DL association set initiated in the previous DL Tx burst.

Counter DAI and total DAI are used in normal manner in codebook determination although some of the DL assignments are transmitted in different COTs;

Counter DAI (with a modulo operation) can be included in each DL grant scheduling PDSCH slot or mini-slot and the counter can be updated based on scheduled PDSCH within the DL association set;

Total DAI can contain information about the number of scheduled or to be scheduled PDSCH (with modulo operation) within the DL association set;

HARQ-ACK transmission time and resource are determined based on the K1 value in the DCI received in the latter COT, i.e. based on Y; and/or Specific handling is needed for the case where during the next COT, UE does not generate any new HARQ feedback to be transmitted within that COT. This is discussed further below.

Also in case of semi-static codebook, UE may be indicated with the specific HARQ timing indicator value K1 ("X") for indicating ACK transmission in a later COT. In the semi-static codebook determination, the UE and the gNB determine a base semi-static HARQ-ACK codebook for PUCCH transmission immediately following DL Tx burst following Rel-15 NR mechanism, where the codebook is likely determined based on the HARQ timing values that may be indicated to UE and possibly based on PDSCH starting positions within the slot. UE appends the base HARQ-ACK codebook with a semi-static codebook portion for HARQ-ACK from previous DL Tx burst.

The size of semi-static codebook portion is determined based on UE processing times assumed in the scheduling.

The UE processing times may be the default processing time values or according to the UE capabilities that UE have reported to the network.

The processing times depend on SCS as well as on DMRS configuration.

The semi-static codebook portion may be consistently present on the codebook (preferred embodiment due to reliability), or appended only if UE has received DL assignments in previous Tx burst for which it has not yet send the associated HARQ-ACK feedback.

Specific embodiment is needed for the case where during the next COT, UE does not generate any new HARQ feedback to be transmitted within that COT. This is discussed further below.

The codebook size determination is illustrated for dynamic codebook and semi-static codebook in FIGS. 4 and 5, respectively.

In the cases of dynamic codebook determination, undefined HARQ-ACK timing value ("X") for K1 is included in both initial timing table and the timing table configured by UE-specific RRC signalling. However, the maximum number of PDSCH associated with the specific value of K1 (X) in certain COT may vary according to the processing time capability of the UE:

in the case of initial access, gNB may not be aware of the UE's processing time capability. Hence, it may operate according to a conservative processing time assumption supported by all UEs, that is, according to the default processing times; and in the RRC connected state, gNB is aware of the UE's processing time capability. Hence, it may operate according to the actual processing time capability of the UE.

In one specific embodiment for dynamic CB adaptation, a gNB may use undefined HARQ-ACK timing value "X" to generate a DL-only COT without any UL control portion at the end of the COT (and where all HARQ-ACK are conveyed via the following COT(s)).

Specific Issue—No New HARQ Feedback Within the Next COT:

It is possible that during the next COT, UE does not generate any new HARQ feedback to be transmitted within that COT. This happens e.g. when:

no PDSCH is scheduled to the UE in the next COT; and next DL Tx burst is so short or UE is scheduled so late on the next DL burst that UE does not have enough processing time to create HARQ feedback transmission within that COT.

In accordance with example embodiments there are few complementary options for such cases:

UE transmits the pending HARQ feedback, that is, the HARQ feedback available at the UE that UE has not yet transmitted, when gNB schedules a specific PUCCH or PUSCH allocation to pull or request HARQ feedback from UE. The feedback may be ordered and reported based on the corresponding HARQ processes numbers;

UE transmits the pending HARQ feedback in next COT on PUCCH resource indicated by the PUCCH resource indicator on the DL assignment(s) of the previous COT. UE determines the PUCCH transmission time based on information included in slot format indicator transmitted on the downlink control channel during the next COT; and/or UE transmits the pending HARQ feedback in the next valid COT with a PDSCH assignment made for the UE.

The example embodiments of the invention provide advantages that allow for constructing HARQ feedback that:

has compact size, contributing to good coverage and avoiding unnecessary overhead;

allows fast feedback within COT for those PDSCHs for which that is possible from UE processing viewpoint;

supports dynamic signaling of HARQ timing as well as dynamic codebook size; and supports HARQ-ACK feedback optimization based on the UE capability/category.

Figure 7A:
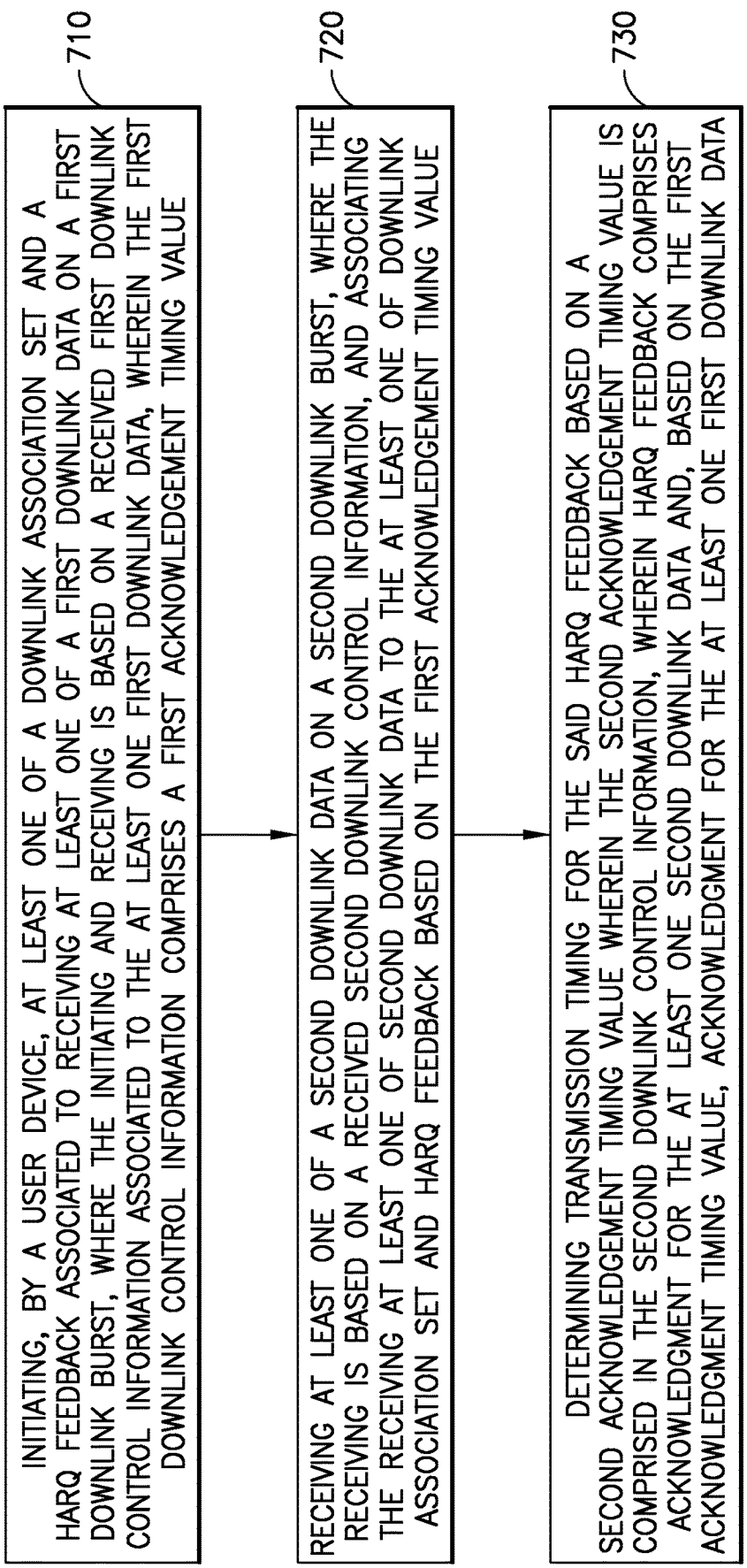
FIGS. 7a and 7b each show a method which may be practiced by an apparatus in accordance with example embodiments of the invention.

FIG. 7a illustrates operations which may be performed by a network device such as, but not limited to, a network device such as a UE 110 as in FIG. 6 or an MS. As shown in step 710 of FIG. 7a there is initiating, by a user device, at least one of a downlink association set and a HARQ feedback associated to receiving at least one of a first downlink data on a first downlink burst, where the initiating and receiving is based on a received first downlink control information associated to the at least one first downlink data, wherein the first downlink control information comprises a first acknowledgement timing value. Then as shown in step 720 of FIG. 7a there is receiving at least one of a second downlink data on a second downlink burst, where the receiving is based on a received second downlink control information, and associating the receiving at least one of second downlink data to the at least one of downlink association set and HARQ feedback based on the first acknowledgement timing value. Then as shown in step 730 of FIG. 7a there is determining transmission timing for the said HARQ feedback based on a second acknowledgement timing value wherein the second acknowledgement timing value is comprised in the second downlink control information.

In accordance with the example embodiments as described in the paragraph above, the receiving downlink data comprises determining at least one acknowledgement value for the downlink data.

In accordance with the example embodiments as described in the paragraphs above, the associating the receiving of downlink data to the at least one of downlink association set and HARQ feedback comprises the inclusion of the determined at least one acknowledgement value to the HARQ feedback.

In accordance with the example embodiments as described in the paragraphs above, further comprising transmitting the said HARQ feedback at the determined transmission timing.

In accordance with the example embodiments as described in the paragraphs above, where the downlink data is downlink shared channel data.

In accordance with the example embodiments as described in the paragraphs above, HARQ feedback comprises acknowledgement values for all received downlink data associated with the at least one of HARQ feedback and downlink association set.

In accordance with the example embodiments as described in the paragraphs above, HARQ feedback comprises acknowledgment for the at least one second downlink data and, based on the first acknowledgment timing value, acknowledgment for the at least one first downlink data.

In accordance with the example embodiments as described in the paragraphs above, a downlink assignment index is comprised in the received downlink control information and the downlink assignment index is reset at a beginning of the at least one downlink association set and HARQ feedback.

In accordance with the example embodiments as described in the paragraphs above, the second downlink burst is set to follow the first downlink burst associated with the downlink association set.

In accordance with the example embodiments as described in the paragraphs above, the downlink association set contain slots from two different downlink transmission bursts with uncertain timing between the two different downlink transmission bursts.

A non-transitory computer-readable medium (Memory(ies) 125 of FIG. 6) storing program code (Computer Program Code 123 and/or Hfb Module 140-2 of FIG. 6), the program code executed by at least one processor (Processor(s) 120 and/or Hfb Module 140-1 of FIG. 6) to perform the operations as at least described in the paragraphs above.

In accordance with an example embodiment of the invention as described above there is an apparatus comprising: means for initiating (transceivers 130 and/or link 176, Computer Program Code 123 and/or Hfb Module 140-2; and Processor(s) 120 and/or Hfb Module 140-1 of FIG. 6), by a user device (UE 110 of FIG. 6), at least one of a downlink association set and a HARQ feedback associated to receiving at least one of a first downlink data on a first downlink burst, where the initiating and receiving is based on a received first downlink control information associated to the at least one first downlink data, wherein the first downlink control information comprises a first acknowledgement timing value; means, for receiving (transceivers 130 and/or link 176 of FIG. 6) at least one of a second downlink data on a second downlink burst, where the receiving is based on a received second downlink control information, and associating the receiving at least one of second downlink data to the at least one of downlink association set and HARQ feedback based on the first acknowledgement timing value; and means for determining (Computer Program Code 123 and/or Hfb Module 140-2; and Processor(s) 120 and/or Hfb Module 140-1 of FIG. 6) transmission timing for the said HARQ feedback based on a second acknowledgement timing value wherein the second acknowledgement timing value is comprised in the second downlink control information.

Figure 7B:
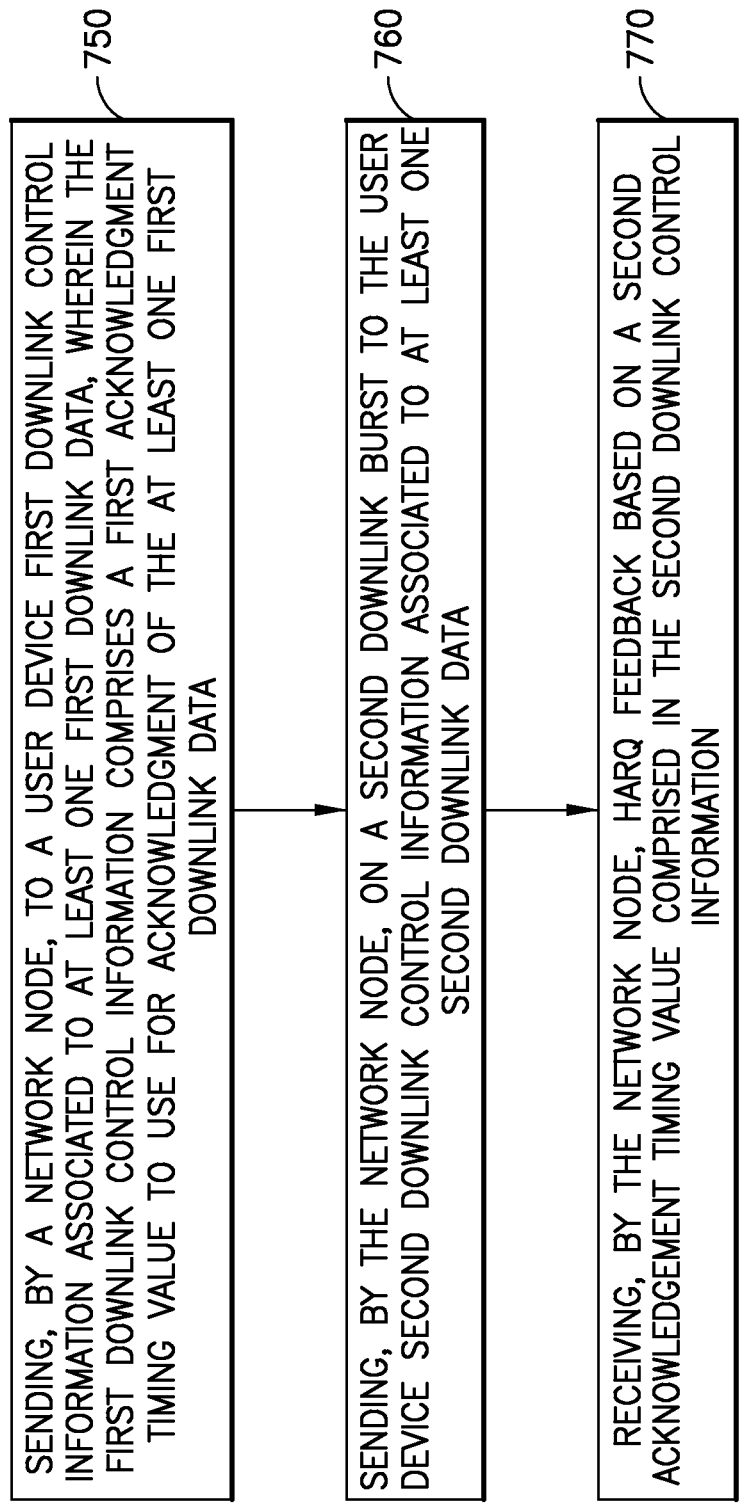

FIG. 7b illustrates operations which may be performed by a network device such as, but not limited to, a network device or node such as, but not limited to, a gNB 170 as in FIG. 6. As shown in step 750 of FIG. 7b there is sending, by a network node, to a user device first downlink control information associated to at least one first downlink data, wherein the first downlink control information comprises a first acknowledgment timing value to use for acknowledgment of the at least one first downlink data. As shown in step 760 of FIG. 7b there is sending, by the network node, on a second downlink burst to the user device second downlink control information associated to at least one second downlink data. Then as shown in step 770 of FIG. 7b there is receiving, by the network node, HARQ feedback based on a second acknowledgement timing value comprised in the second downlink control information, wherein HARQ feedback comprises acknowledgment for the at least one second downlink data and, based on the first acknowledgment timing value, acknowledgment for the at least one first downlink data.

In accordance with the example embodiments as described in the paragraph above, the second downlink control information is set to follow a downlink burst associated with the first acknowledgment timing value.

A non-transitory computer-readable medium (Memory(ies) 155 of FIG. 6) storing program code (Computer Program Code 153 and/or Hfb Module 150 of FIG. 6), the program code executed by at least one processor (Processor(s) 152 and/or Hfb Module 150 of FIG. 6) to perform the operations as at least described in the paragraphs above.

In accordance with an example embodiment of the invention as described above there is an apparatus comprising: means for sending (transceivers 160 and/or link 176, Computer Program Code 153 and Processor(s) 152 and/or Hfb Module 150 of FIG. 6), by a network node (gNB 170 of FIG. 6), to a user device (UE 110 of FIG. 6) first downlink control information associated to at least one first downlink data, wherein the first downlink control information comprises a first acknowledgment timing value to use for acknowledgment of the at least one first downlink data; means for receiving (transceivers 160 and/or link 176, Computer Program Code 153 and Processor(s) 152 and/or Hfb Module 150 of FIG. 6), by the network node (gNB 170 of FIG. 6), with the timing the HARQ feedback associated to the at least one first downlink data based on the first acknowledgment timing value; means for sending (transceivers 160 and/or link 176, Computer Program Code 153 and Processor(s) 152 and/or Hfb Module 150 of FIG. 6), by the network node, on a second downlink burst to the user device second downlink control information associated to at least one second downlink data; and means for receiving (transceivers 160 and/or link 176, Computer Program Code 153 and Processor(s) 152 and/or Hfb Module 150 of FIG. 6), by the network node (gNB 170 of FIG. 6), HARQ feedback based on a second acknowledgement timing value comprised in the second downlink control information, wherein HARQ feedback comprises acknowledgment for the at least one second downlink data and, based on the first acknowledgment timing value, acknowledgment for the at least one first downlink data.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
    initiating, by a user device, at least one of a downlink association set and a hybrid automatic repeat request feedback associated to receiving at least one of a first downlink data on a first downlink burst, where the initiating and receiving is based on a received first downlink control information associated to the at least one first downlink data, wherein the first downlink control information comprises a first acknowledgement timing value;
    receiving at least one of a second downlink data on a second downlink burst, where the receiving is based on a received second downlink control information, and associating the receiving at least one of second downlink data to the at least one of downlink association set and hybrid automatic repeat request feedback based on the first acknowledgement timing value; and
    determining transmission timing for the hybrid automatic repeat request feedback based on a second acknowledgement timing value, wherein the second acknowledgement timing value is comprised in the second downlink control information.

2. The method of claim 1, wherein the receiving downlink data comprises determining at least one acknowledgement value for the downlink data.

3. The method of claim 1, wherein the associating the receiving of downlink data to the at least one of downlink association set and hybrid automatic repeat request feedback comprises the inclusion of the determined at least one acknowledgement value to the hybrid automatic repeat request feedback.

4. The method of claim 1, further comprising transmitting the hybrid automatic repeat request feedback at the determined transmission timing.

5. The method of claim 1, wherein the downlink data is downlink shared channel data.

6. The method of claim 1, wherein the hybrid automatic repeat request feedback comprises acknowledgement values for all received downlink data associated with the at least one of hybrid automatic repeat request feedback and downlink association set.

7. The method of claim 1, wherein the hybrid automatic repeat request feedback comprises acknowledgment for the at least one second downlink data and, based on the first acknowledgment timing value, acknowledgment for the at least one first downlink data.

8. The method of claim 1, wherein a downlink assignment index is comprised in the received first downlink control information and the downlink assignment index is reset at a beginning of the at least one of downlink association set and hybrid automatic repeat request feedback.

9. The method of claim 1, wherein the second downlink burst is set to follow the first downlink burst associated with the downlink association set.

10. The method of claim 1, wherein the downlink association set contain slots from two different downlink transmission bursts with uncertain timing between the two different downlink transmission bursts.

11. An apparatus, comprising:
    at least one processor; and
    at least one memory including computer program code, wherein the at least one memory and the computer program code are configured, with the at least one processor, to cause the apparatus at least to:
    initiate, by a user device, at least one of a downlink association set and a hybrid automatic repeat request feedback associated to receiving at least one of a first downlink data on a first downlink burst, where the initiating and receiving is based on a received first downlink control information associated to the at least one first downlink data, wherein the first downlink control information comprises a first acknowledgement timing value;
    receive at least one of a second downlink data on a second downlink burst, where the receiving is based on a received second downlink control information, and associating the receiving at least one of second downlink data to the at least one of downlink association set and hybrid automatic repeat request feedback based on the first acknowledgement timing value; and
    determine transmission timing for the hybrid automatic repeat request feedback based on a second acknowledgement timing value, wherein the second acknowledgement timing value is comprised in the second downlink control information.

12. The apparatus of claim 11, wherein the receiving downlink data comprises determining at least one acknowledgement value for the downlink data.

13. The apparatus of claim 11, the associating the receiving of downlink data to the at least one of downlink association set and hybrid automatic repeat request feedback comprises the inclusion of the determined at least one acknowledgement value to the hybrid automatic repeat request feedback.

14. The apparatus of claim 11, wherein the at least one memory including the computer program code is configured with the at least one processor to cause the apparatus to transmit the said hybrid automatic repeat request feedback at the determined transmission timing.

15. The apparatus of claim 11, wherein the downlink data is downlink shared channel data.

16. The apparatus of claim 11, wherein the hybrid automatic repeat request feedback comprises acknowledgement values for all received downlink data associated with the at least one of hybrid automatic repeat request feedback and downlink association set.

17. An apparatus, comprising:
    at least one processor; and
    at least one memory including computer program code, wherein the at least one memory and the computer program code are configured, with the at least one processor, to cause the apparatus at least to:
    send, by a network node, to a user device first downlink control information associated to at least one first downlink data, wherein the first downlink control information comprises a first acknowledgment timing value to use for acknowledgment of the at least one first downlink data;
    send, by the network node, on a second downlink burst to the user device second downlink control information associated to at least one second downlink data; and
    receive, by the network node, hybrid automatic repeat request feedback based on a second acknowledgement timing value comprised in the second downlink control information, wherein hybrid automatic repeat request feedback comprises acknowledgment for the at least one second downlink data and, based on the first acknowledgment timing value, acknowledgment for the at least one first downlink data.

18. The apparatus of claim 17, wherein the second downlink control information is set to follow a downlink burst associated with the first acknowledgment timing value.

* * * * *